July 13, 1965 C. R. BERGEVIN ET AL 3,194,282
SPRING LOOPING MACHINE
Filed Oct. 30, 1961 5 Sheets-Sheet 3

United States Patent Office 3,194,282
Patented July 13, 1965

3,194,282
SPRING LOOPING MACHINE
Charles R. Bergevin and John W. Diachenko, Torrington, Conn., assignors to The Torrington Manufacturing Company, Torrington, Conn., a corporation of Connecticut
Filed Oct. 30, 1961, Ser. No. 148,530
12 Claims. (Cl. 140—103)

This invention relates to a machine for forming loops at the ends of coil springs and one object of the invention is to provide such a machine wherein a modular construction is employed to permit convenient adaptation of the machine to the formation of end loops at one or both ends of a plurality of coil springs.

Another object of the invention is to provide a spring looping unit particularly adapted for use in the aforementioned modular construction.

Still another object of the invention is to provide an improved rotary indexing means in a spring looping machine of the type mentioned.

And a still further object of the invention is to provide a simple and yet effective means for providing extended end loops on coil springs in a machine of the type referred to.

The drawings show a prefererd embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

*General organization*

Figure 1:
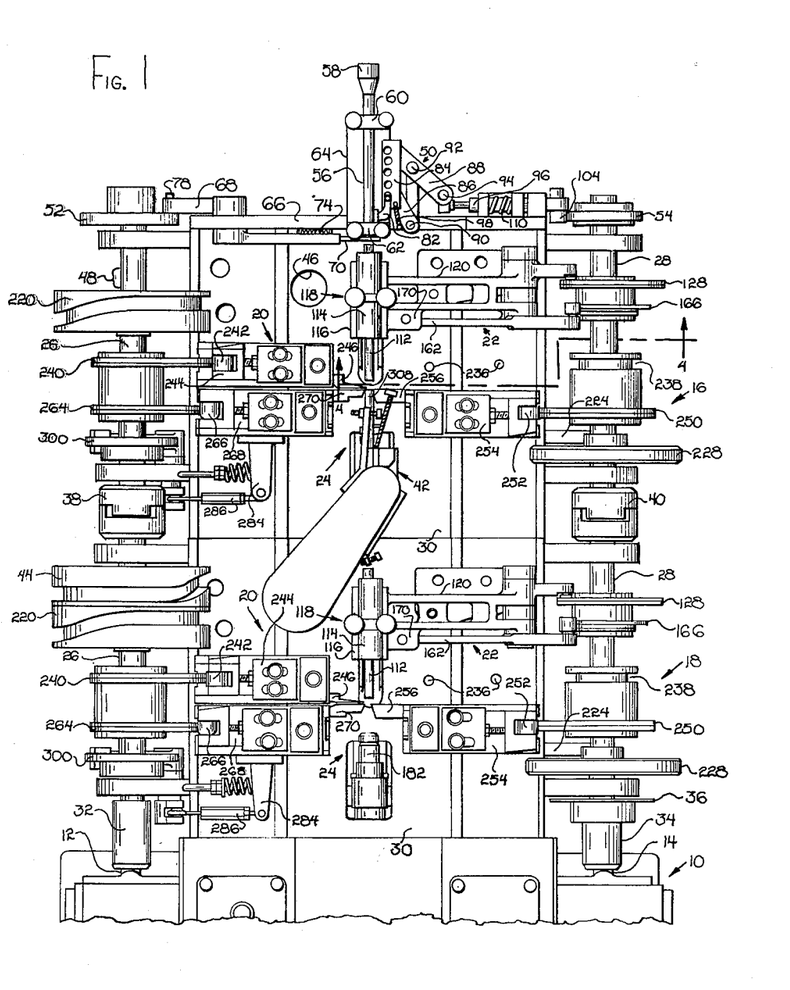
FIG. 1 is a front elevational view of a spring looping machine constructed in accordance with the present invention.

In general, the spring looping machine of the present invention comprises a base assembly such as that indicated generally at 10 in FIG. 1. The base assembly 10 is adapted to support the majority of machine components and includes horizontally spaced first and second or left and right-hand vertical drive shafts 12 and 14. The drive shafts 12 and 14 are adapted for connection with a power operating means such as an electric motor, the latter element being optionally supported by the base assembly or remotely located. Connection of the shafts 12 and 14 with the motor may be effected by known means such that the shafts will rotate in unison though perhaps in opposite directions.

Also included in the looping machine are similar first and second spring looping units indicated generally respectively at 16 and 18. The looping units 16 and 18 are each adapted to successively loop springs at one end and each of said units comprises a cam operated looping mechanism and cam operated spring transfer and indexing means for receiving and presenting springs to the looping mechanism. The looping mechanisms on the units 16 and 18 may be identical and are indicated generally at 20, 20. Similarly, identical spring transfer means are indicated generally at 22, 22 and identical spring indexing means are indicated generally at 24, 24.

Also included in each of the spring looping units 16 and 18 are first and second or left and right-hand vertical cam shafts 26 and 28. The shafts 26 and 28 of one looping unit may be identical respectively with the shafts 26 and 28 of the other unit and the shafts 26 and 28 of each unit are disposed in horizontally spaced relationship adjacent a frame 30 of the unit. Various cams on the aforesaid shaft serve to operate the looping mechanisms 20, 20, the transfer means 22, 22, and the indexing means 24, 24.

In accordance with one aspect of the invention, the spring looping units 16 and 18 are selectively connectible with and atop the base assembly 10 with the cam shafts 26 and 28 of a connected unit rotated by the aforesaid drive shafts 12 and 14. That is, either of the units 16, 18 can be placed atop the base assembly 10 (as shown in the case of the unit 18) and connected with said assembly as by suitable bolts not shown. Connection between the cam shafts 26 and 28 of the unit and the drive shafts 12 and 14 of the base assembly may then be effected by means of suitable couplings 32 and 34. The couplings 32 and 34 may be identical and, optionally, a timing disc may be provided on one of said couplings as indicated at 36 on the coupling 34.

The spring looping units 16 and 18 are also selectively connectible with each other in vertically stacked relationship with their corresponding cam shafts connected for rotation in unison. Thus, the units 16 and 18 may be connected together as by suitable bolts not shown in the order shown with the unit 16 atop the unit 18 or, alternatively, the order of the units may be reversed. Means for interconnecting the corresponding cam shafts 26, 26 and 28, 28 of the units may comprise identical left and right-hand couplings 38 and 40 as shown.

The modular or unit construction of the spring looping machine of the present invention will now be apparent. With the two spring looping units 16 and 18 connected together as shown or in reverse order and with the lower unit connected with the base assembly 10, a machine for looping both ends of each of a plurality of springs is provided and it is necessary only to provide means for transferring springs from one spring looping unit to the other. Alternatively, and when it is desired to loop only at one end of each of a plurality of springs, a single spring looping unit can be employed atop the base assembly 10.

A means for transferring springs from one spring looping unit to the other is shown in the form of a cam operated inverting mechanism 42. In accordance with the modular or unit construction concept, the mechanism 42 is selectively connectible with the spring looping units 16 and 18. The mechanism 42 is shown connected with the lower spring looping unit 18 and as including a cam 44 on the cam shaft 26 of said unit. When the spring looping unit 16 is employed as a lower or base unit, a mechanism such as 42 can be connected therewith employing an opening 46 in the frame 30 thereof and a portion 48 of the cam shaft 26 thereof. When connected with either of the units 16 and 18, the spring inverting mechanism 42 operates to successively receive springs from a transfer device 22 thereabove and to deliver such springs in inverted attitude to a transfer device 22 therebelow. Thus, in the arrangement shown in FIG. 1, springs are looped at one end by the looping unit 16, inverted and delivered to the looping unit 18, and then looped at the opposite end by said unit 18.

A final component of the spring looping machine of the present invention comprises a cam operated escapement device adapted to intermittently deliver springs to a transfer device 22. Such an escapement device, indicated generally at 50, is in accordance with the invention selectively connectible with the spring looping units 16 and 18. As shown, the device 50 is connected with the spring looping unit 16 as by suitable bolts not shown and said device operates to intermittently deliver springs to the transfer device 22 of said unit. However, it will be apparent that the escapement device 50 can be similarly connected with the spring looping unit 18 when the latter is used in a single looping operation or as an upper looping unit in a double looping operation. In all cases, cams included in the escapement device, such as cams 52 and 54, are mounted on the cam shafts of the associated spring looping unit so as to provide for operation of the escapement device in properly timed relationship with the other components of the unit.

*Escapement device*

Figures 2, 3:
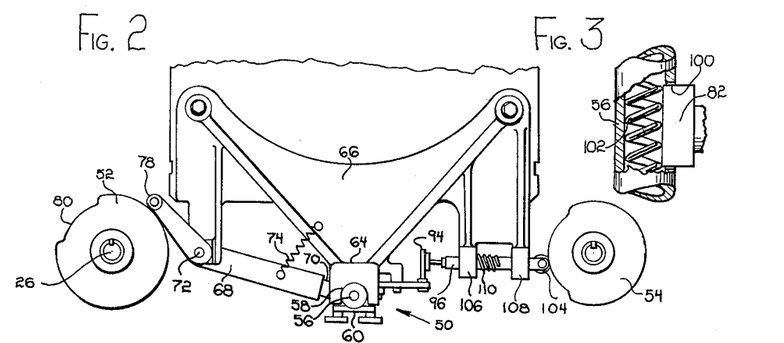
FIG. 2 is a top plan view of the machine showing an escapement device with background parts omitted.
FIG. 3 is an enlarged fragmentary view showing a portion of the escapement device.

Referring particularly to FIGS. 1 and 2, it will be observed that the escapement device 50 includes a vertical tube 56 provided at its upper end with a funnel 58. The funnel 58 is adapted to receive springs continuously as from a vibratory hopper and to direct the springs into the tube 56 successively with their axes vertical. The tube 56 is held in position by means of suitable adjustable upper and lower brackets 60 and 62 and by means of a backing member 64 supported by a frame 66 of the escapement device.

As best shown in FIG. 2, the frame 66 of the escapement device 50 also supports a cam operated lever 68 which carries a gate member 70 at its inner end. The lever 68 is swingable about a pivot 72 at the urging of a biasing spring 74 and the afore-mentioned cam 52, a follower 78 being mounted on the lever 68 at its outer end.

It will be observed in FIG. 1 that the gate member 70 is disposed beneath the lower end of the tube 56 to hold a stack of springs in said tube. As shown, the gate member 70 and the lever 68 are held in such position by the cam 52 and the spring 74 serves to move the lever and gate member rearwardly when a cam depression 80 is reached. Rearward movement of the gate member 70 allows a single spring to drop from the tube 56 to the transfer device 22 as will be seen. Such operation is effected by the cam 52 and the spring 74 in timed relationship with the remaining components in the spring looping unit. However, it is to be noted here that the cam 52 and all other cams shown in the drawings and mentioned hereinbelow in the specification are illustrative only. Particular cam contours and particular interrelationships of cam contours for proper timing will be readily determined by those skilled in the art.

There is also included in the escapement device 50 a second member engageable with a spring in the tube 56 whereby to hold and release the same. Said second member is identified at 82 in FIGS. 1 and 3 and, as best shown in FIG. 1, said member is adjustably secured to a link 84 pivotally connected with substantially parallel links 86 and 88. The link 86 is pivotally connected with the frame 66 at 90 and the link 88 is similarly connected with said frame at 92. At its outer end the link 88 carries a pin 94 engaged and urged inwardly by a cam operated plunger 96. Inward movement of the pin 94 and resulting clockwise swinging movement of the links 86 and 88 is opposed by a small spring 98 connected between the link 84 and the frame 66. Thus, it will be seen that the link 84 and the member 82 are urged inwardly by the spring 98 and outwardly by the plunger 96.

In FIG. 3 it will be observed that the member 82 is entered in a suitable opening 100 in the tube 56 so as to engage a spring 102 at the urging of the spring 98. The plunger 96 urges the member 82 outwardly to release a spring such as 102 and to permit the same to drop beneath the member 82 and into engagement with the aforesaid gate member 70. Thereafter, the plunger 92 permits the spring 98 to urge the member 82 into engagement with the next vertically adjacent spring and to hold said spring in the tube 56 during the interval when the gate member 70 opens to release the spring 102.

As best shown in FIG. 2, the plunger 96 carries a cam follower 104 at its outer end portion and is slidably journaled in bosses 106 and 108 on the frame 66. A biasing spring 110 urges the plunger 96 and the follower 104 into engagement with the aforesaid cam 54. Said cam and the spring 110 cooperatively move the plunger 96 inwardly and outwardly as required to provide the aforedescribed operation of the member 82 in properly timed relationship with the operation of the gate member 70.

*Transfer device*

Figure 4:
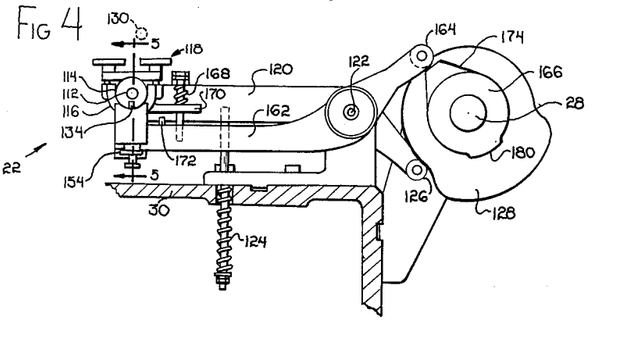
FIG. 4 is a fragmentary horizontal section taken generally as indicated at 4—4 in FIG. 1 and showing a transfer device.
Figure 5:
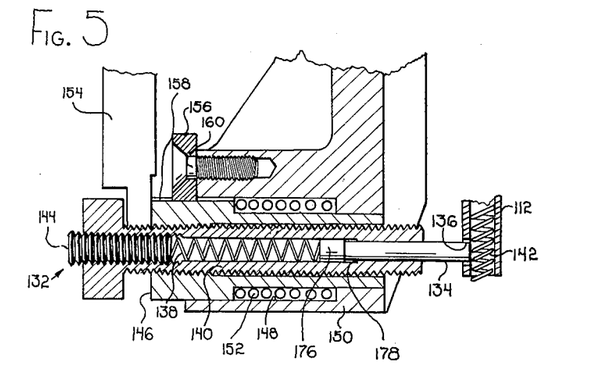
FIG. 5 is an enlarged fragmentary vertical section taken generally as indicated at 5—5 in FIG. 4.

Springs released intermittently by the aforedescribed escapement device are received by the transfer device 22 on the spring looping unit 16. However, the transfer devices 22, 22 may be identical as mentioned above and it is therefore necessary to describe only one of said devices. Referring particularly to FIGS. 1, 4 and 5, it will be observed that the transfer device 22 includes a vertical tube 112 held in a sleeve 114 which in turn is secured to a backing element 116 by a clamping device 118. The backing element 116 is mounted on the inner end portion of a cam lever 120 pivoted at 122. The cam lever 120 is urged rearwardly by a spring 124 and a follower 126 at the outer end portion thereof engages a cam 128 on the cam shaft 28. The lever 120 and the tube 112 are shown in a rearward position wherein the upper end of the tube 112 is disposed in a first vertical plane beneath the tube 56 of the escapement device 50. In this position of the tube 112 springs are delivered thereto by the escapement device 50 and formation of loops on the springs occurs. In the forward position of the tube 112, represented at 130, a spring with a loop formed thereon is discharged from the tube 112 to the inverting mechanism 42. Alternatively, and when the transfer device 22 is employed in a single loop forming operation or on the lower spring looping unit in a double loop forming operation, a spring can be discharged from the tube 112 at the position 130 to a spring receiving container.

Movement of the tube 112 between the position shown and the position 130 is accomplished by the spring 124 and the cam 128 acting cooperatively. Such movement is effected in properly timed relationship with the remaining components of the spring looping machine such that a spring is received by the tube 112 and looped in a position shown and thereafter discharged from the tube at the position 130.

In order that springs may be held in and released from the tube 112 as required, there is provided a holding means indicated generally at 132 in FIG. 5. Said holding means comprises a small plunger 134 movable horizontally in an opening 136 in the tube 112 adjacent the lower end of the tube. A light spring 138 in a sleeve 140 urges the plunger 134 into the opening 136 and into engagement with a spring such as 142 in the tube 112. Preloading of the spring 138 may be accomplished by means of a screw 144 threaded into a rear-end portion of the sleeve 140. In turn, the sleeve 140 is threaded into an outer sleeve 146 slidable in a bore 148 in a member 150 which depends from the lever 120. The outer sleeve 146 is urged rearwardly in the bore 148 by means of a spring 152 and is engaged at its rear-end surface by a lever extension 154. To prevent rotation of the outer sleeve 146 in the bore 148 a key 156 is held in a keyway 158 in said sleeve by a screw 160.

Referring now to FIG. 4, it will be observed that the lever extension 154 depends from a cam lever 162 pivoted at 122 and carrying a follower 164 at its outer end portion. The follower 164 engages a cam 166 on the cam shaft 28. Urging the follower 164 into engagement with the cam 166 is a spring 168 associated with a flange 170 on the aforesaid backing member 116. A small stop pin 172 engages the flange 170 to limit forward movement of the lever 162 relative to the lever 120.

In operation of the holding mechanism 132 the plunger 134 is normally in an inner or forward position at the urging of the spring 138 so as to block a spring dropped into the tube 112 from the escapement device 50. The spring 168 serves to keep the stop pin 172 in engagement with the flange 170 and the lever extension 154 is engaged by the sleeve 146, the spring 152 urging said sleeve rearwardly and into engagement with the extension. Thus, a spring dropped into the tube 112 is initially held in the tube by the plunger 134 disposed beneath the spring. On passage of a selected interval of time, a rise 174 on the cam 166 engages the follower 164 and moves the lever 162 to the position shown in FIG. 4. In such position of the lever 162 the extension 154 thereon is moved rearwardly a sufficient distance to permit the sleeve 146 sufficient rearward movement for engagement of a head 176 on the plunger 134 with a shoulder 178 and for rearward movement of the plunger 134 out of engagement with the spring 142 in the tube 112. In consequence, the spring 142 commences to fall from the tube 112 and, as will be seen, engages an indexing head so as to be held partially in the tube 112 in a position substantially as indicated in FIG. 5 and in FIGS. 14 and 15. The follower 164 thereupon falls from the rise 174 on the cam 166 and the plunger 134 once again engages the spring 142, but now at its side substantially as shown in FIG. 5. As will be seen, the plunger 134 operates during this portion of the machine's operation to provide a drag force on the spring 142 while the spring is rotatably indexed for the loop forming operation. Subsequently, the plunger 134 serves to hold the spring such as 142 during the loop forming operation and during subsequent movement of the tube 112 from the position shown in FIG. 4 to the position 130.

During movement of the tube 112 to the position 130 the spring 168 holds the stop pin 172 in engagement with the flange 170 and the lever 162 follows the lever 120 with the follower 164 on the former engaging or at least approximately engaging the cam 166. With the tube 112 in the position 130 the follower 164 is engaged by a rise 180 on the cam 166 whereupon the lever extension 154 once again moves rearwardly permitting the sleeve 146 to move rearwardly and causing engagement of the shoulder 178 with the plunger head 176 and the resulting movement of the plunger 134 out of the opening 136. Thus, a spring 142 is permitted to fall from the tube 112 to the inverting mechanism 42 or to a container for collecting completed springs.

*Indexing means*

Figure 9:
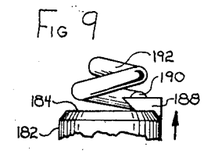
FIG. 9 is an enlarged fragmentary side view of an indexing head shown in FIG. 8, a portion of a coil spring being shown in engagement with the head.
Figure 10:
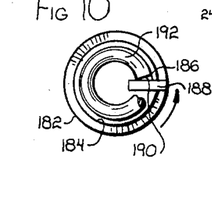
FIG. 10 is an enlarged fragmentary top view of the indexing head of FIG. 9.

The indexing means 24, 24 may be identical as mentioned. As the upper indexing means 24 is disposed behind the inverting mechanism 42 the corresponding lower indexing means 24 will be described with particular reference to FIGS. 1 and 6 through 10. An indexing head 182 is best shown in FIGS. 9 and 10 as having a substantially flat horizontal upper surface 184 and a substantially vertical surface 186, the latter being provided by a blade 188 secured in a suitable notch in the head. Both rotary and vertical movement of the indexing head 182 are provided for and the head is movable from a lower position shown in FIG. 8 vertically upwardly to a position slightly below the lower end of a tube 112 on the transfer device 22. Preferably and as will be described hereinbelow, the head is moved rapidly upwardly from the FIG. 8 position to a position beneath its said upper position and is then rotated and simultaneously elevated slowly to its final upper position. Movement of the head is coordinated with the release of a spring from a tube 112 so that the spring falls into engagement with the head surface 184 as it commences its rotary and slow upward movement. During the rotary and slow upward movement of the head 182 the blade 188 engages the end surface 190 of a spring 192, FIGS. 9 and 10, and rotates the spring into proper position for operation thereon by looping tools to be described hereinbelow. During rotation of the spring 192 by the indexing head 182 the spring is disposed partially in the tube 112 as described above for the spring 142 and is engaged by the plunger 134 to provide a drag force. The provision of the drag force in combination with the rotary and slow upward movement of the indexing head 182 results in a highly efficient indexing operation.

Figure 8:
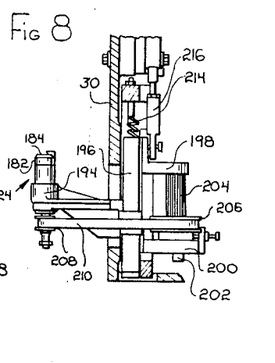
FIG. 8 is a fragmentary vertical section taken generally as indicated at 8—8 in FIG. 7.

As best shown in FIG. 8 the indexing head 182 is journaled in a forwardly extending bracket 194 mounted on a vertical slide 196. The slide 196 also carries rearwardly extending upper and lower brackets 198 and 200 which provide bearing support for a vertical shaft 202. The shaft 202 carries an axially elongated gear 204 and a pulley 206 connected for rotation with said gear. The pulley 206 is connected in driving relationship with a pulley 208 which rotates the indexing head 182 by means of a belt 210. Thus, the gear 204 may be rotated to impart rotary movement to the indexing head 182 and the slide 196 may be moved vertically to impart vertical movement to the head.

Figure 6:
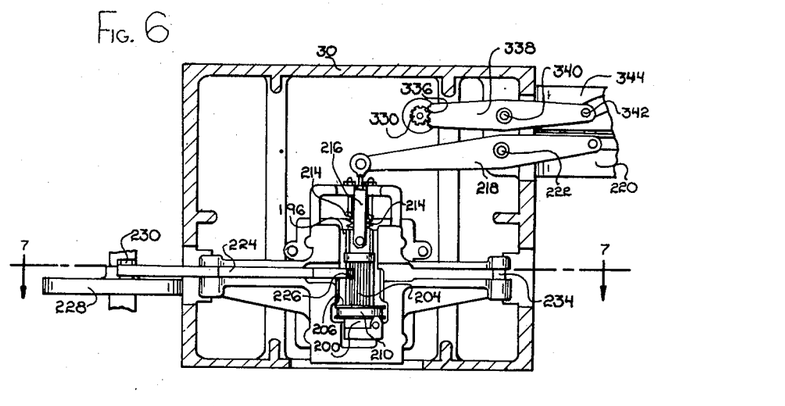
FIG. 6 is a rear elevational view of approximately the lower half portion of the spring looping machine of FIG. 1.
Figure 7:
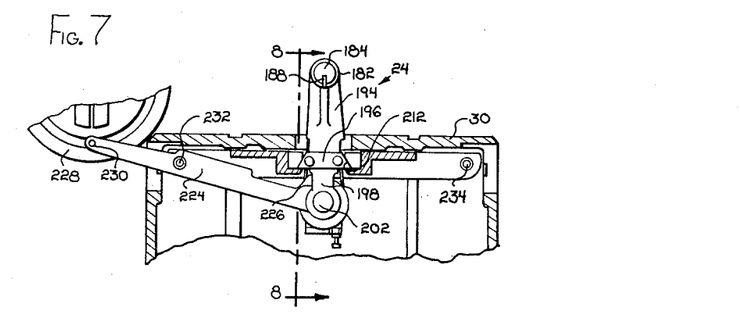
FIG. 7 is a fragmentary horizontal section taken generally as indicated at 7—7 in FIG. 6.

As best illustrated in FIG. 7, the slide 196 is held in a guideway 212 for vertical sliding movement. Springs 214, 214 best shown in FIG. 6 urge the slide 196 downwardly in its guideway 212 and a link 216 is pivotally connected with the slide for urging the same upwardly. A cam lever 218 pivotally connected with the link 216 and oscillated in properly timed relationship by a cam 220 provides for the required upward movement of the link 216. That is, the cam 220 causes the lever 218 to pivot about a pin 222 and to elevate the link 216, the slide 196 and the indexing head 182 first rapidly and thereafter slowly during an indexing operation.

Rotary movement of the indexing head 182 is accomplished through operation of the aforementioned pulleys and belts and the gear 204 and through operation of a cam lever 224 which carries a segment 226 at its inner end. The gear segment 226 meshes with the gear 204 irrespective of the vertical position of the slide 196 so as to rotate the gear under the influence of a cam 228. The cam 228 engages a follower 230 at the outer end of the lever 224 whereby to pivot the lever about a point 232 as required to swing the gear segment 226 and rotate the indexing head 182 during an indexing operation. Both left and right-hand springs are accommodated by the looping machine and a change in the direction of rotation of the indexing head 182 can be provided for by alternative arrangements of the lever 224. That is, the lever 224 may be alternatively pivoted about a point 234 and operatively associated with a cam 228 mounted on the opposite cam shaft of the spring looping unit.

When a spring partially disposed in the tube 112 has been indexed by indexing device 24, the indexing head 182 is lowered out of engagement with the spring by operation of the link 216, the lever 218 and the cam 220. The spring is then in a state of readiness for formation of a loop at its lower end by means of a loop forming mechanism 20.

*Loop forming mechanism*

The loop forming mechanisms 20, 20 may be identical as mentioned and each said mechanism preferably comprises three cam and tool slide assemblies as shown. Optionally, a fourth cam and tool slide assembly can be provided utilizing frame openings 236, 236 and cam grooves 238, 238 in FIG. 1.

Figures 14, 16, 17:
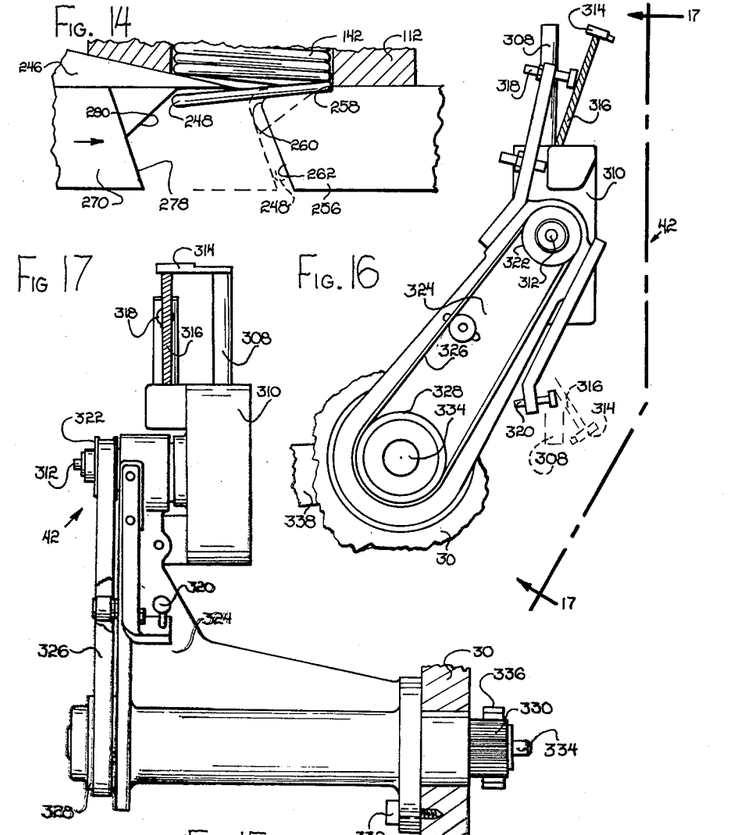
FIG. 14 is a somewhat schematic enlarged fragmentary view illustrating spring looping tools in operation on a spring.
FIG. 16 is an enlarged fragmentary front view of the spring looping machine showing a spring inverting and transfer mechanism with its cover removed.
FIG. 17 is a generally vertical section taken generally as indicated at 17—17 in FIG. 16.

A first or upper left-hand cam and tool slide assembly comprises a cam 240 on the cam shaft 26, a follower 242 and a tool slide 244. The slide 244 is movable horizontally inwardly and outwardly on a guideway or base, not shown, and carries a tool 246. The tool 246 may vary widely in form in accordance with the type of end loop to be formed and said tool is operative on an indexed spring held by a tube 112 on inward sliding movement of the slide 244. As illustrated in FIG. 14, the tool 246 takes the form of a separating knife operative on an inward stroke of the slide on the lowermost coil or coil portion 248 of a spring 142 held in the tube 112. That is, the knife 246 separates said lowermost coil or coil portion 248 as illustrated on inward movement of its slide 244.

Referring again to FIG. 1, it will be observed that a second or lower right-hand cam and slide assembly of the forming mechanism 20 comprises a cam 250 on the shaft 28, a follower 252, a slide 254, and a tool 256 held by the slide. As in the case of the slide 244, the slide 254 is slidable on a guideway or base, not shown, inwardly or outwardly at the urging of the cam 250. The tool 256 on said slide is operable on an inward stroke of the slide and, in FIG. 14, it will be observed that the said tool may take the form of a mandrel. The tool or mandrel 256 moves inwardly to the position shown in FIG. 14 on an inward stroke of the slide 254 so as to present a shoulder 258 to the lowermost coil or coil portion on a spring 142 in the tube 112. Said shoulder serves as a backing member to permit efficient separation of the lowermost coil or coil portion by the separating knife 246. Additionally, the mandrel 256 has a rounded bearing surface 260 and a downwardly and rightwardly inclined bearing surface 262. As will be seen, said two surfaces are employed in the bending of the lowermost coil or coil portion 248 to form an end loop on the spring 142.

Figure 11:
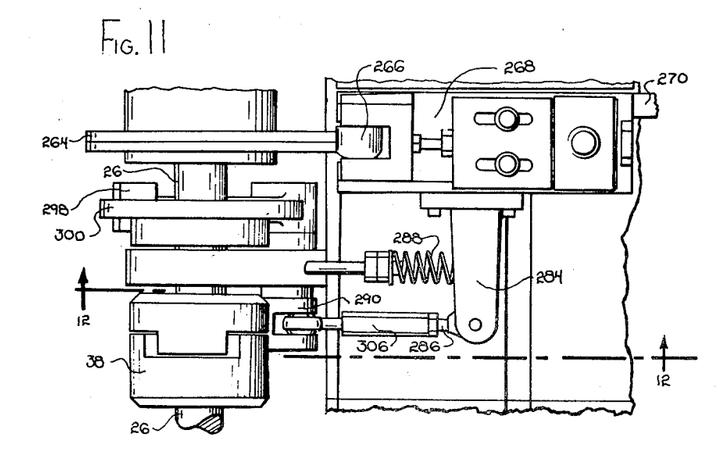
FIG. 11 is an enlarged fragmentary front view of the spring looping machine showing a cam and slide assembly.
Figures 12, 13:
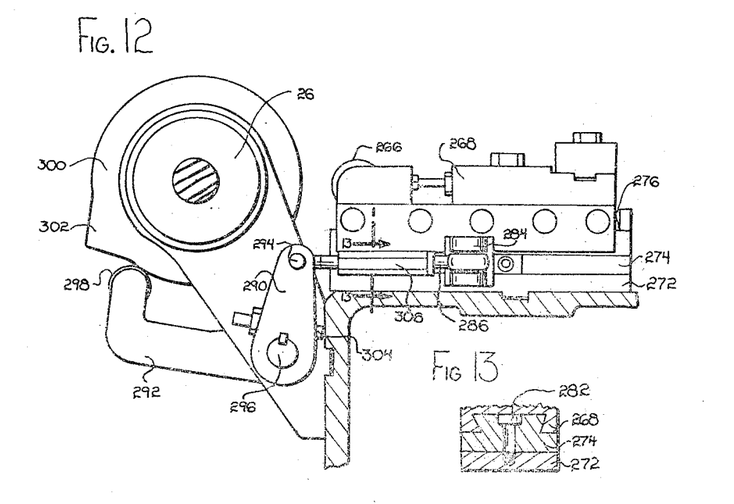
FIG. 12 is an enlarged horizontal section taken generally as indicated at 12—12 in FIG. 11.
FIG. 13 is an enlarged fragmentary vertical section taken generally as indicated at 13—13 in FIG. 12.

A third or lower left-hand cam and tool slide assembly in the looping mechanisms 20 is best illustrated in FIGS. 11 and 12. Said assembly comprises a cam 264 on the left-hand cam shaft 26, a follower 266, a slide 268, and a tool 270. The slide 268 is movable inwardly and outwardly along a two-part base or guideway best illustrated in FIGS. 12 and 13 and which includes a fixed part 272 and a swingable part 274. The slide 268 is urged outwardly by a spring 276 partially shown in FIG. 12 into engagement with the cam 264. Similar springs, not shown, serve a similar function for the aforementioned slides 244 and 254.

The tool 270 carried by the slide 268 is operative on an inward stroke of the slide and, as shown in FIG. 14, said tool comprises a forming tool. The tool has a downwardly and rightwardly inclined forming surface 278 and an upwardly and rightwardly inclined forming surface 280. The surfaces 278 and 280 are arranged to engage radially spaced portions of a lower coil or coil portion 248 and, as shown, the surface 280 engages said coil or coil portion rearwardly of the surface 278. On inward movement of the tool 270 from the full line position to the dotted line position in FIG. 14 the surface 280 bends the coil or coil portion 248 about the bearing surface 260 on the mandrel 256 and the tool surface 278 urges said coil or coil portion into engagement with the bearing surface 262 on the mandrel. The broken line position of the coil or coil portion 248 in FIG. 14 represents the position of a formed loop prior to retraction of the tools 246, 256 and 270. On retraction of the tools the loop will return approximately to an axial plane. However, it is to be understood that tools can be provided for loops of various other orientations and of widely varying types.

Figure 15:
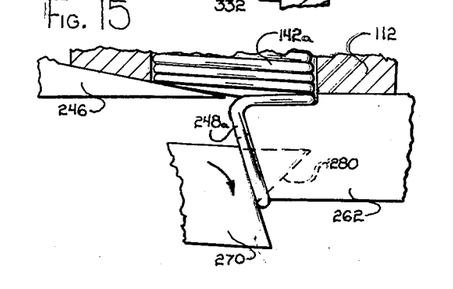
FIG. 15 is similar to FIG. 14, but shows the spring looping tools at another interval in operation wherein a spring end loop is extended.

In FIG. 15 there is shown a spring 142a in the tube 112 and the shearing knife 246 and mandrel 262 are illustrated as in FIG. 14. The forming tool 270 is also shown but it is to be noted that the said tool is illustrated in a position wherein it has moved downwardly and rightwardly from the broken line position of FIG. 14. Such additional movement of the tool 270 is effective to extend a loop in the axial direction, such extended loops being required in many applications. It will be apparent that the surface 280 on the forming tool 270 engages a loop to extend the same during downward and rightward terminal movement of the tool. It will be further apparent that such movement of the tool can be effectively provided for by means described hereinbelow.

The aforementioned swingable base or guideway part 274 is pivotally movable about a pin 282 best shown in FIG. 13. Thus, the part 274 and the slide 268 can be swung downwardly in unison during a terminal portion of the inward movement of the slide effected by the cam 264. A bracket 284 connected with the base or guideway part 274 has a link 286 pivotally connected therewith and a biasing spring 288 engages the said bracket and tends to hold the part 274 and the slide 268 in a horizontal attitude. The link 286 is moved outwardly to swing the said part 274 and slide 268 in a clockwise direction about the pin 282 by means of a crank arm 290 and a cam lever 292. The said link 286 is pivotally connected with the arm 290 at 294 and said arm and lever are connected together for pivotal movement about a point 296. A follower 298 on the lever 292 engages a cam 300 mounted on the cam shaft 26. Thus, a rise 302 on the cam 300 can swing the lever 292 and the crank arm 290 in a counterclockwise direction in FIG. 12 to move the link 286 outwardly and to swing the base part 274 and the slide 268 in a clockwise direction. A stop pin 304 limits clockwise movement of the crank arm 290 and thus establishes the normal substantially horizontal position of the slide 268. Additionally, an adjusting element 306 in the link 286 provides for selection of the amount or degree of downward movement of the tool 270 at the terminal portion of its inward stroke.

It is also to be noted that the cam 300 can be provided with a depression rather than a rise whereby to provide for upward swinging movement of the forming tool 270 at the terminal portion of the inward slide stroke. Such adaptation of the cam will result in a loop which is urged upwardly or inwardly rather than downwardly relative to the spring. Also, it is to be observed that all cam and slide assemblies can be interchanged to provide for various types of loops. The cam 300, for example, can be mounted on the cam shaft 28 when the associated cam and slide assembly are disposed in the position occupied by the second or lower right-hand cam and slide assembly.

*Spring inverting mechanism*

After a spring has been looped at one end by the above-described looping mechanism, it is transferred forwardly by the transfer device 22 as previously mentioned and discharged to the inverting mechanism 42 or a suitable container. As best shown in FIGS. 16 and 17, the inverting mechanism 42 has a spring receiving tube 308 which projects upwardly from a holder 310. The spring receiving tube 308 is disposed in a second vertical plane which also contains the transfer device tube 112 when the latter is in its forward position. As mentioned, indexing and loop forming occur in a first vertical plane spaced rearwardly from the said second vertical plane.

The holder 310 for the tube 308 is rotatable about an axis 312 through approximately 180° from the full line position shown in FIG. 16 to the broken line position therein. Said tube is closed at the bottom so as to receive a spring from a tube 112 of the transfer device 22 and hold the same in the full line position of FIG. 16. A tube cap 314 is mounted on a light spring 316 so as to be held away from the upper end of the tube 308 by a stop pin 318 when the tube 308 is in its full line or upper position. On clockwise rotation of the tube 308, the cap 314 covers the open end of the tube and retains a spring therein until the tube approaches its lower position. As the tube approaches said lower position, a second stop pin 320 engages the cap spring 316 and displaces the cap whereby to open the tube and discharge the spring therefrom. The tube 112 of the lower transfer device 22 thus receives the spring from the inverting mechanism in inverted attitude whereupon its unlooped end may be operated upon by the indexing means and loop forming mechanism of the lower spring looping unit 18.

A means for rotating the tube holder 310 from its upper to its lower position and thence back to its upper position includes a pulley 322 journaled in a frame 324 and engaged with a belt 326. The belt 326 is driven from a second pulley 328 which in turn is connected with and driven by a gear 330 disposed behind the frame 30 of the looping unit 18. As best shown in FIG. 17, the frame 324 is secured to the frame 30 as by a suitable screw 332 and said frame 324 also provides bearing support for a shaft 334 carrying the pulley 328 and the gear 330.

The gear 330 is rotated intermittently by means of a gear segment 336 partially shown in FIG. 17, but better illustrated in FIG. 6. Said gear segment 336 is formed at an inner end portion of a cam lever 338 pivoted at 340 and carrying a follower 342 engageable with a cam 344 on the cam shaft 26. It will be apparent that the cam 344 can operate the lever 338 whereby to rotate the gear 330 and the tube 308 and its holder 310 as required to transfer springs between the spring looping units 16 and 18 in proper timed relationship with the remaining components of said units.

We claim:

1. The combination in a spring looping machine of a base assembly including horizontally spaced first and second vertical drive shafts each adapted for connection with a power operating means, similar first and second looping units each adapted to successively loop springs at one end and each comprising a cam operated looping mechanism and cam operated transfer and indexing means for receiving and presenting springs to the looping mechanism, each of said units also comprising horizontally spaced first and second vertical cam shafts carrying cams for operating the looping mechanism and the transfer and indexing means thereof, and said units being selectively connectible with and atop said base assembly with the cam shafts of a connected unit rotated by said drive shafts and said units also being selectively connectible with each other in vertically stacked relationship with their corresponding cam shafts connected for rotation in unison, a cam operated spring inverting mechanism selectively connectible with said looping units and adapted successively to receive springs from the transfer and indexing means of one unit and successively to deliver the same in inverted attitude to the transfer and indexing means of the other unit, and a cam operated escapement device selectively connectible with said looping units adjacent their transfer and indexing means and adapted successively to receive springs and deliver the same to the transfer and indexing means in timed relationship with the operation of the latter, said looping mechanism being operable on springs in a first vertical plane and said inverting mechanism serving to handle springs in a second vertical plane when said looping units are connected in stacked relationship with the inverting mechanism connected with the lower unit and with said escapement mechanism connected with the upper unit, and said transfer and indexing means being adapted to move springs between said two vertical planes for transfer of the same from said upper unit to said lower unit via said inverting mechanism.

2. The combination in a spring looping machine as set forth in claim 1 wherein each of said transfer and indexing means includes a vertical spring receiving and holding tube cam operated for movement between said two vertical planes and provided with a cam operated plunger engageable with a spring in said tube, and wherein each of said means also includes a cam operated indexing head adapted to engage and rotate a spring in said receiving and holding tube.

3. The combination in a spring looping machine as set forth in claim 2 wherein said escapement device includes a vertical spring receiving and holding tube disposed approximately in said first vertical plane and a cam operated member adapted to engage and hold a spring in said tube.

4. The combination in a spring looping machine as set forth in claim 2 wherein said spring inverting mechanism includes a spring receiving tube rotatable in said second vertical plane through approximately 180° to receive a spring from one of said transfer and indexing means and deliver the same in inverted attitude to the other of said means.

5. For use in a spring looping machine, a looping unit comprising an upright frame carrying horizontally spaced first and second cam shafts, a looping mechanism on said frame comprising at least two opposing slides carrying tools operable to form a loop in movement transverse to the spring axis, first and second cam means on said first and second shafts respectively for operating said slides, means on said frame for successively receiving springs and indexing the same for a looping operation at one end portion thereof by said looping mechanism, said means serving also to hold a spring during formation of a loop thereon and comprising a vertical tube movable generally horizontally between first and second positions and a spring biased plunger engageable with a spring in said tube and also comprising a rotary indexing head disposed beneath said tube when the latter is in said first position, cam means on at least one of said cam shafts for operating said last mentioned means whereby said tube is moved to said first position and said plunger is operated first to release a spring in said tube and thereafter to frictionally engage the spring with a portion thereof projecting beneath the tube, said cam means being operable also to cause said rotary indexing head to positively engage a spring released by the plunger and to rotate the same to an indexed position against the frictional resistance of said plunger, and said cam means being still further operable to move said tube to said second position and to cause said plunger to release the spring at said position for discharge from said tube, means on said frame for successively delivering springs to said receiving and indexing means, and cam means on at least one of said shafts for operating said last mentioned means to deliver springs in timed relationship with the operation of said looping mechanism.

6. A spring looping unit as set forth in claim 5 wherein said indexing head is characterized by the provision of a substantially flat horizontal surface engageable with a lower end coil of a spring to stop the descent of the spring and by the provision of a narrow substantially vertical surface projecting above said horizontal surface and adapted to positively engage the free end surface of said lower end coil of the spring to rotate and index the same.

7. A spring looping unit as set forth in claim 6 wherein the aforesaid cam means and means connecting said cam means with said indexing head provide for the slow elevation of said head during rotary indexing movement of the head.

8. For use in a spring looping machine, a looping unit comprising an upright frame carrying horizontally spaced first and second cam shafts, means on said frame for successively receiving springs and indexing the same for a looping operation at one end portion thereof, said means serving also to hold a spring during formation of a loop thereon with the spring axis substantially vertical and with the loop formation occurring at the lower end of the spring, a first slide and cam assembly adapted to move a separating knife into engagement with a lower end portion of a spring held by said receiving and indexing means, a second cam and slide assembly adapted to move a mandrel into engagement with a lower end portion of a spring held by said receiving and indexing means, and a third cam and slide assembly adapted to move a loop forming tool into engagement with a lower end portion of a spring held by said spring receiving and indexing means, said third cam and slide assembly including means for moving said looping tool first horizontally and thereafter in a combined horizontal and vertical direction whereby to form and to vertically displace a loop at the lower end portion of the spring.

9. A looping unit as set forth in claim 8 wherein said third cam and slide assembly comprises a slide and a guideway the latter of which is mounted for pivotal movement in a substantially vertical plane.

10. A spring looping unit as set forth in claim 9 wherein said third cam and slide assembly comprises first and second cams respectively connected with said slide and guideway for effecting horizontal movement of the former and combined horizontal and vertical movement of both.

11. A spring looping unit as set forth in claim 10 wherein said second cam serves to provide for vertical downward movement of said guideway and slide and for extension of the spring loop.

12. The combination in a spring looping machine of a vertical tube adapted to receive springs successively at its upper end, said tube having an opening adjacent its lower end, a generally horizontal spring biased plunger movable into and out of said opening to engage a spring adjacent the lower end of the tube, means for operating said plunger so that it initially blocks a spring deposited in the tube and thereafter releases the spring momentarily and then engages and frictionally holds the spring at the urging of its biasing spring, an indexing head disposed beneath the lower end of the tube so as to be engaged by and stop the descent of a spring released by said plunger, said indexing head being provided with a substantially flat horizontal surface for engaging the lowermost end coil of a spring released by said plunger and with a narrow substantially vertical surface for positively engaging the free end surface of such a coil, and operating means for said indexing head serving to rotate the same and to thereby rotate a spring engaged by said plunger, said operating means being adapted also to provide for the slow elevation of said head during rotation of the same in engagement with a spring.

References Cited by the Examiner

UNITED STATES PATENTS

| 1,051,497 | 1/13 | Harter. | |
| 2,334,505 | 11/43 | Peterson | 140—103 |
| 2,703,592 | 3/55 | Penny | 140—103 |
| 3,040,784 | 6/62 | Ashley-Wing | 140—103 |
| 3,069,024 | 12/62 | Penny | 140—103 |

CHARLES W. LANHAM, *Primary Examiner.*

RICHARD A. WAHL, *Examiner.*